E. CONNOLLY.
Apparatus for Forming the Necks, Shoulders, and Lips of Vials and other Bottles.
No. 220,344. Patented Oct. 7, 1879.
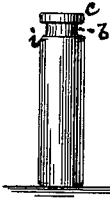
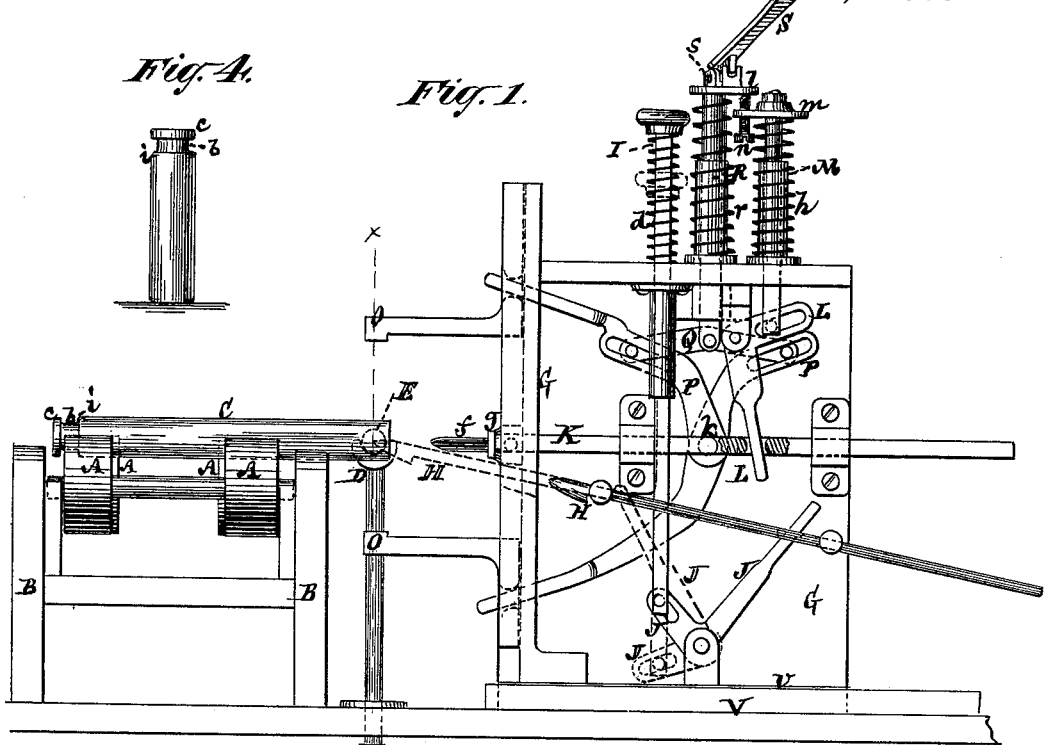
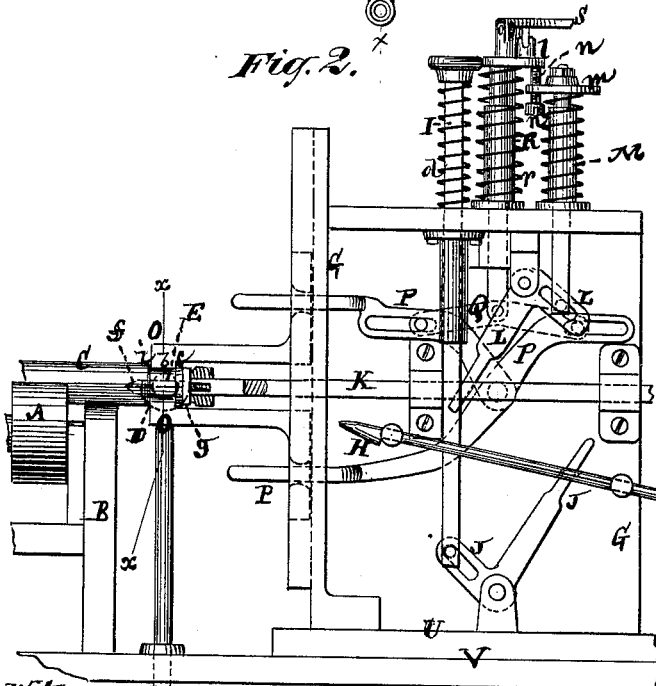
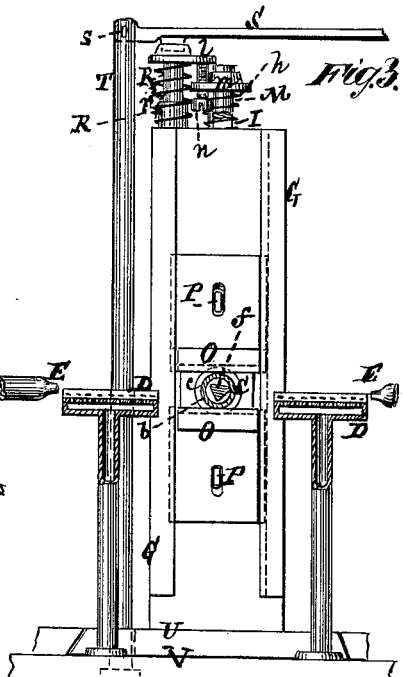

UNITED STATES PATENT OFFICE.

EDWARD CONNOLLY, OF HOBOKEN, NEW JERSEY.

IMPROVEMENT IN APPARATUS FOR FORMING THE NECKS, SHOULDERS, AND LIPS OF VIALS AND OTHER BOTTLES.

Specification forming part of Letters Patent No. 220,344, dated October 7, 1879; application filed March 26, 1879.

*To all whom it may concern:*

Be it known that I, EDWARD CONNOLLY, of Hoboken, in the county of Hudson and State of New Jersey, have invented certain new and useful Improvements in Apparatus for Forming the Necks, Lips, and Shoulders of Vials and other Bottles, of which the following is a full, clear, and exact description, reference being had to the accompanying drawings, forming part of this specification.

This invention, although more particularly intended to be used in the manufacture of vials for homeopathic medicines and other purposes, is also applicable to the manufacture of larger bottles. It will, however, be more particularly described with reference to the manufacture of vials for homeopathic medicines.

In the manufacture of such vials it is customary to first form a glass tube or section of a glass tube equal to the length of the vial or of two vials by transversely dividing said tube through its center, and to form the necks and lips on the end or ends of said tube by means of hand-tools applied to said end or ends, subject to the application of heat and of a rotating or turning action of the tube, after which the tube is fashioned or divided and manipulated to form the bottom or closed end of the vial.

This invention consists in certain means, including oppositely-arranged jaws and mechanism in or connected with a frame for opening and closing said jaws, to form the neck, lip, and shoulder of a vial or bottle as the glass tube of which the same is composed is rotated for the purpose, in combination with a rod or spindle capable of projection within the open end of the tube under manipulation, to give the proper shape and a uniform caliber to the interior of the neck.

It also consists in special means for operating the jaws by which the neck, lip, and the shoulder at the base of the neck of the vial or bottle are formed, and for manipulating the spindle which shapes the interior of the neck; likewise means for varying the length of the neck or distance of the lip from the shoulder at the mouth end of the bottle; also, a rod or spindle capable of projection within the heated end of the tube for centering the latter and keeping it in shape while being heated, and for preventing the unequal heating of the tube around the end under manipulation, the whole forming a solid and steady hold for the tube while under preparation, and for the means used to fashion the neck, lip, and shoulder of a vial or bottle.

In the accompanying drawings the invention is shown as applied to the manufacture of vials produced by forming suitable necks, lips, and shoulders on the opposite ends of a piece of glass tube, which is afterward divided intermediately of its length, and suitably closed to form the bottoms of two vials; but it is equally applicable to a glass tube of only sufficient length to form a single vial or bottle; and it relates to the formation of the neck, lip, and shoulders of a vial or bottle, whether made from a tube of a sufficient length to produce a single bottle or duplicate bottles, it only being necessary to reverse the ends of the tube in the machine when forming a neck, lip, and shoulder on each end of the tube to produce two vials or bottles from the same tube.

Figure 1 represents a side elevation of an apparatus constructed in accordance with the invention prior to closing the jaws which are used to shape the neck and lip of a vial on the end of the tube. Fig. 2 is a further side elevation with the parts in position when said jaws are closed. Fig. 3 is a transverse section on the line $x$ $x$, and Fig. 4 a longitudinal view of a finished vial.

A A indicate rolls fast on two parallel horizontal shafts or axles mounted in or on a headstock or frame, B. These rolls serve to support and to provide for the rolling or turning of the piece or length of glass tube C, on the end or each opposite end of which alternately, accordingly as said tube is intended to form one or two vials, the neck $b$ and lip $c$ of a vial are fashioned.

D D are burners for heating the end of the tube to be worked, and which should have combined with them blow-pipes E E, for directing the flames onto the end of the tube under operation as said end is projected a sufficient distance in front of the rolls to bring it in line with the flames.

G is a frame, which carries the mechanism used to shape the shoulder, neck, and lip of the vial on the end of the tube as the latter is rotated by hand on its roll-support A A, and during which motion, and while the end of the tube to be worked is being brought to a proper heat, a centering-rod or spindle, H, of a half-spear-point or other suitable shape at its forward end, may be projected, as shown by dotted lines in Fig. 1, into the heated end of the tube, to support the latter and keep it in shape while being heated, and whereby it may be more equally heated all around its exposed end. This centering and supporting rod has a sliding motion within the frame G in a suitable direction to enter the tube C, and is projected forward when necessary to introduce it within the tube by pressing down on a rod, I, which is connected by a bell-crank, J, with the centering and supporting rod H. A spring, $d$, serves to return said rod H back to its normal position (shown by full lines in Figs. 1 and 2) when not in use or it is required to operate the jaws. Various means, however, may be employed to actuate and control the rod H, and in some cases the latter may be altogether dispensed with.

K is another sliding spindle or rod, carried by the frame G, and capable of projection within the heated end of the tube C, as shown in Fig. 2, for the purpose of internally forming the lip and neck of the vial after the end of the tube composing the same has been suitably heated, and the centering and supporting rod H is withdrawn. This rod K is preferably pointed at its forward end portion, $f$, and of a triangular or other angular construction in its transverse section at said end, to correspond with the interior dimensions of the neck and lip, and by its angular shape to prevent the binding of the hot glass upon it. Said rod is provided with a button or shield, $g$, in rear of the entering end portion, $f$, to give the necessary end finish to the lip $c$ as said rod is projected forward against the heated end of the tube. A bell-crank, L, operated by a rod, M, serves, by pressing down on said rod, to project the rod K into the heated end of the tube C, and a spring, $h$, to retire or return the same after the neck and lip have been formed on the end of the tube.

O O are the jaws, different sizes of which may be applied to the apparatus to act in conjunction with the rod K and its button or plate $g$, to form the neck $b$, shoulder $i$, and lip $c$ of the vial, by bringing said jaws to bear on the exterior of the heated end of the tube between what constitutes the shoulder and lip of the vial. Such adjustment of the jaws, as shown in Fig. 2, may be effected either separately or conjointly with the forward projection of the rod K, but preferably simultaneously therewith, to which end, and to actuate said jaws O O, the latter, which are fitted to slide up and down within the frame G, are controlled, respectively, by two levers, P P, having a common fulcrum at $k$, and constructed to engage with a yoke, Q, which is made capable of depression by a sliding rod, R, and lever S, fitted to bear upon the rod R, that, in being depressed, causes an arm or plate, $l$, on it to bear down on the rod M, or on an arm or plate, $m$, attached to said rod, but preferably on an adjusting-screw, $n$, whereby not only the rod K is moved simultaneously with the closing of the jaws O O, but the projection of the rod K may be adjusted for the purpose of forming the lip $c$, and keeping it of uniform size. A spring, $r$, on the rod R serves to return the jaws to their open position after the same have performed their duty.

The lever S has its fulcrum $s$ upon a rod, T, fast to the base U of the frame G, which is free to slide within ways on a lower base, V, by bearing laterally on the lever S, or otherwise moving the base U forward or backward, for the purpose of relieving the jaws from the shoulder $i$ of the vial, and for varying, as required, the length of the neck of the vial.

The lower base, V, and the frame B are suitably secured on a bench or table to give to the apparatus a steady action.

Other means than those herein described may be used for operating the jaws O O and internally shaping rod K, and instead of said jaws being arranged to move up and down, they may be arranged to move horizontally toward or from each other, and the operating mechanism and burners be arranged to accord with such a change in position of the jaws.

I claim—

1. In apparatus for forming the neck, lip, and shoulder of a vial or other bottle, the combination, with means for rotating the tube from which the bottle is formed, and with means for heating the end portion of said tube to be manipulated, of a frame having combined with or applied to it opening and closing jaws for operation upon the exterior of said heated end portion of the tube, mechanism carried by said frame for operating said jaws, a sliding rod having attached to it a button or shield for forming the interior of the neck and outer end surface of the lip, and means for operating said rod, substantially as specified.

2. The combination, with means for rotating the tube from which the bottle is formed, and with means for heating the end portion of said tube to be manipulated, of a supporting and centering rod capable of projection within the heated end portion of the tube, and mechanism for projecting said rod within the tube, and of withdrawing it therefrom, essentially as and for the purpose herein set forth.

3. In apparatus for forming the neck, lip, and shoulder of a vial or other bottle, the combination, with mechanism for rotating the tube from which the bottle is formed, and with means for heating the end portion of said tube to be manipulated, of jaws for forming the exterior of the neck, a sliding rod having an attached shield for shaping the interior of the neck and outer end surface of the lip, mechanism for operating said jaws and said rod, a hand-lever for manipulating both said jaws and said rod, and an adjusting-screw for varying the projection of said rod within the tube relatively to the action of the jaws, substantially as specified.

4. The combination, with the sliding frame G, for adjusting the neck and lip forming devices relatively to the heated end of the tube to be worked, of the jaws O O, the sliding rod or spindle K, having an attached shield, $g$, and mechanism for operating said jaws and rod, whereby the length of the neck of the bottle may be varied, as required, essentially as described.

5. The combination of the sliding frame G, the hand-lever S, the jaws O O, the rod R, the spring $r$, the levers P P, the yoke Q, the plates or arms $l\ m$, the rod K, having an attached button or shield, $g$, the bell-crank L, the rod M, and the spring $h$, substantially as and for the purposes specified.

EDWARD CONNOLLY.

Witnesses:
MORRIS A. TYNG,
EDWARD P. JESSUP.